(12) United States Patent
Chung et al.

(10) Patent No.: US 11,301,708 B2
(45) Date of Patent: Apr. 12, 2022

(54) IMAGE SENSING CIRCUIT AND METHOD

(71) Applicant: NOVATEK Microelectronics Corp., Hsin-Chu (TW)

(72) Inventors: Jung-Chen Chung, Hsinchu County (TW); Jen-Yi Lin, Hsinchu (TW); Min Huang, Taoyuan (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 50 days.

(21) Appl. No.: 17/015,085

(22) Filed: Sep. 9, 2020

(65) Prior Publication Data

US 2021/0097318 A1 Apr. 1, 2021

Related U.S. Application Data

(60) Provisional application No. 62/909,161, filed on Oct. 1, 2019.

(51) Int. Cl.
*G06K 9/20* (2006.01)
*G06K 9/00* (2006.01)
*H04N 5/378* (2011.01)

(52) U.S. Cl.
CPC .......... *G06K 9/209* (2013.01); *G06K 9/0004* (2013.01); *H04N 5/378* (2013.01)

(58) Field of Classification Search
CPC .. G06K 9/209; G06K 9/0004; G06K 9/00046; H04N 5/378; H04N 5/374
See application file for complete search history.

(56) References Cited

U.S. PATENT DOCUMENTS

| 9,448,679 | B2 | 9/2016 | Lee |
| 2003/0090583 | A1 | 5/2003 | Mizutani |
| 2004/0021786 | A1 | 2/2004 | Nakamura |
| 2011/0090193 | A1 | 4/2011 | Imai |
| 2011/0261006 | A1 | 10/2011 | Joharapurkar |
| 2017/0161536 | A1* | 6/2017 | Lin ....................... G06K 9/0002 |
| 2020/0111825 | A1* | 4/2020 | Yin ................... H01L 27/14601 |
| 2020/0218870 | A1* | 7/2020 | Kwon .................. G06K 9/0004 |
| 2021/0303811 | A1* | 9/2021 | Chung ................. G06K 9/0004 |

FOREIGN PATENT DOCUMENTS

| CN | 1649152 A | 8/2005 |
| CN | 102999237 A | 3/2013 |
| CN | 102112951 B | 6/2014 |
| CN | 105427830 A | 3/2016 |
| CN | 106919927 A | 7/2017 |
| CN | 107102761 A | 8/2017 |
| CN | 107679444 A | 2/2018 |
| CN | 107980142 A | 5/2018 |
| CN | 108090467 A | 5/2018 |
| CN | 110419074 A | 11/2019 |
| CN | 110663115 A | 1/2020 |
| TW | 201533502 A | 9/2015 |

* cited by examiner

*Primary Examiner* — Abhishek Sarma
(74) *Attorney, Agent, or Firm* — Winston Hsu

(57) ABSTRACT

An image sensing circuit includes a plurality of readout circuits and a pre-charge control circuit. Each of the readout circuits is coupled to a sensing line among a plurality of sensing lines and configured to receive a sensing voltage among a plurality of sensing voltages through the corresponding sensing line, wherein at least one of the readout circuits is further configured to receive at least one first pre-scan voltage through the corresponding sensing line prior to reception of the sensing voltage. The pre-charge control circuit, coupled to the readout circuits, is configured to perform a plurality of steps. The steps include receiving the at least one first pre-scan voltage from the at least one readout circuit; calculating a first pre-charge voltage according to the at least one first pre-scan voltage; and pre-charging the sensing lines to the first pre-charge voltage before the readout circuits receive the sensing voltages.

29 Claims, 13 Drawing Sheets

IMAGE SENSING CIRCUIT AND METHOD

CROSS REFERENCE TO RELATED APPLICATIONS

This application claims the benefit of U.S. Provisional Application No. 62/909,161, filed on Oct. 1, 2019, the contents of which are incorporated herein by reference.

BACKGROUND OF THE INVENTION

1. Field of the Invention

The present invention relates to an image sensing circuit and method, and more particularly, to an image sensing circuit and method for fingerprint sensing.

2. Description of the Prior Art

Fingerprint sensing technology is widely applied in a variety of electronic products such as a mobile phone, laptop, tablet, personal digital assistant (PDA), and portable electronics, for realizing identity recognition. The fingerprint sensing allows a user to perform identity recognition conveniently, where the user only needs to put his/her finger on a fingerprint sensing pad or area to login the electronic device instead of entering long and tedious username and password.

A fingerprint, touch and display integration (FTDI) circuit is usually applied to deal with the fingerprint sensing function for a display panel. With an optical fingerprint sensing scheme, the panel may deliver light during the fingerprint sensing operation. When a finger touch on the panel is detected, the light may be reflected from the touch finger, and thus the reflected light including the information of peak and valley of the fingerprint may be received by photodiodes disposed on the panel, to generate voltage signals carrying the fingerprint information. The fingerprint sensor then sends the voltage signals to the FTDI circuit. Subsequently, the FTDI circuit may process the voltage signals of fingerprint sensing by amplifying the signals and converting the signals into digital data. The digital image data may be forwarded to a host, and the host may include an algorithm for recognizing the fingerprint image based on the received image data, so as to complete the fingerprint recognition process. With the in-display fingerprint sensing scheme, the fingerprint sensor including the photodiodes may be spread over the entire screen, allowing the fingerprint image to be sensed on any place of the screen.

Since the fingerprint sensor is disposed on the panel, it should be implemented with the thin-film transistor (TFT) process. In general, the performance of the TFT process is much worse than the performance of the complementary metal oxide semiconductor (CMOS) process commonly used in an integrated circuit (IC). In addition, under the trends of large-scale panel, the parasitic capacitance on the sensing line for transmitting the voltage signals becomes larger and larger, which requires a longer settling time for driving the sensing line to its target voltage. The increasing settling time degrades the user experience for fingerprint sensing. Thus, there is a need for improvement over the prior art.

SUMMARY OF THE INVENTION

It is therefore an objective of the present invention to provide a novel image sensing circuit and a related image sensing method, in order to solve the abovementioned problems.

An embodiment of the present invention discloses an image sensing circuit, which comprises a plurality of readout circuits and a pre-charge control circuit. Each of the plurality of readout circuits is coupled to a sensing line among a plurality of sensing lines and configured to receive a sensing voltage among a plurality of sensing voltages through the corresponding sensing line, wherein at least one of the plurality of readout circuits is further configured to receive at least one first pre-scan voltage through the corresponding sensing line prior to reception of the sensing voltage. The pre-charge control circuit, coupled to the plurality of readout circuits, is configured to perform a plurality of steps. The steps include receiving the at least one first pre-scan voltage from the at least one readout circuit; calculating a first pre-charge voltage according to the at least one first pre-scan voltage; and pre-charging the plurality of sensing lines to the first pre-charge voltage before the plurality of readout circuits receive the plurality of sensing voltages.

Another embodiment of the present invention discloses an image sensing method for an image sensing circuit. The image sensing circuit has a plurality of readout circuits, each of which coupled to a sensing line among a plurality of sensing lines. The image sensing method comprises a plurality of steps. The steps include receiving, by at least one of the plurality of readout circuits, at least one first pre-scan voltage through a corresponding sensing line among the plurality of sensing lines; calculating a first pre-charge voltage according to the at least one first pre-scan voltage; pre-charging the plurality of sensing lines to the first pre-charge voltage; and receiving, by the plurality of readout circuits, a plurality of sensing voltages after the plurality of sensing lines are pre-charged.

Another embodiment of the present invention discloses an image sensing circuit, which is coupled to a panel through a plurality of sensing lines. The panel has a plurality of sensing pixels. The image sensing circuit comprises an image processing circuit, a readout circuit and an analog front-end (AFE) circuit. The image processing circuit is configured to control a reset switch of a first sensing pixel among the plurality of sensing pixels to be turned on in a reset period and turned off in a sensing period. The readout circuit is configured to receive a sensing voltage from the first sensing pixel through a corresponding sensing line among the plurality of sensing lines in the sensing period, and receive a reset voltage from the first sensing pixel through the corresponding sensing line in the reset period. The AFE circuit is configured to generate an image sensing signal of the first sensing pixel according to the sensing voltage and the reset voltage.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
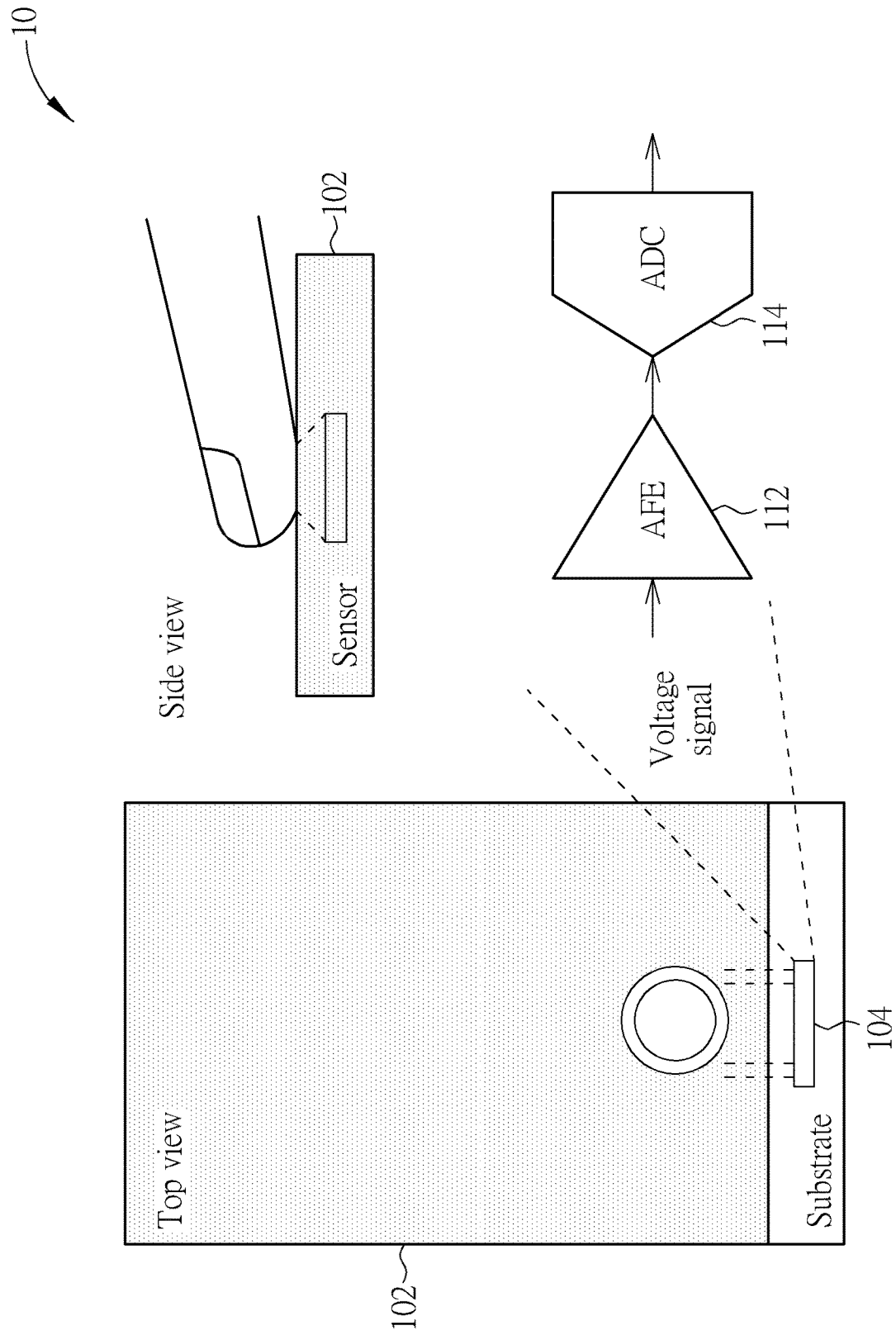
FIG. 1 is a schematic diagram of an image sensing system according to an embodiment of the present invention.

Please refer to FIG. 1, which is a schematic diagram of an image sensing system 10 according to an embodiment of the present invention. As shown in FIG. 1, the image sensing system 10 includes a panel 102 and an image sensing circuit 104. The panel 102 may be any type of display panel such as a liquid crystal display (LCD) panel, an organic light-emitting diode (OLED) panel, or the like. The panel 102 may include a fingerprint sensor array having a great number of sensing pixels spread over the entire screen, to realize in-display fingerprint sensing on any place of the screen. The fingerprint sensor is usually implemented with a thin-film transistor (TFT) process on the substrate of the panel 102. The image sensing circuit 104 may be a fingerprint, touch and display integration (FTDI) circuit, which may be an integrated circuit (IC) implemented in a chip. The FTDI circuit may control the fingerprint sensing operation to receive the fingerprint sensing image from the panel 102, and also control the display operation of the panel 102. The image sensing circuit 104 may be disposed on a substrate such as a flexible printed circuit board (FPC), to be connected to the TFT sensor array of the panel 102 through wire connections on the circuit board.

As shown in FIG. 1, during the fingerprint sensing operation, when a finger touch is detected on a specific area of the panel 102, the panel 102 may deliver light at the specific area. The light reflected from the touch finger may be sensed by the photodiodes in the TFT sensor to generate sensing voltage signals, which are further received by the image sensing circuit 104 via the sensing lines. In an embodiment, the image sensing circuit 104 includes an analog front-end (AFE) circuit 112 for receiving voltage signals from the panel 102 and performing amplification on the voltage signals. The image sensing circuit 104 may also include an analog-to-digital converter (ADC) 114, for converting the voltage signals into digital data, to be processed and recognized by a host or core processor at the back end.

Figure 2:
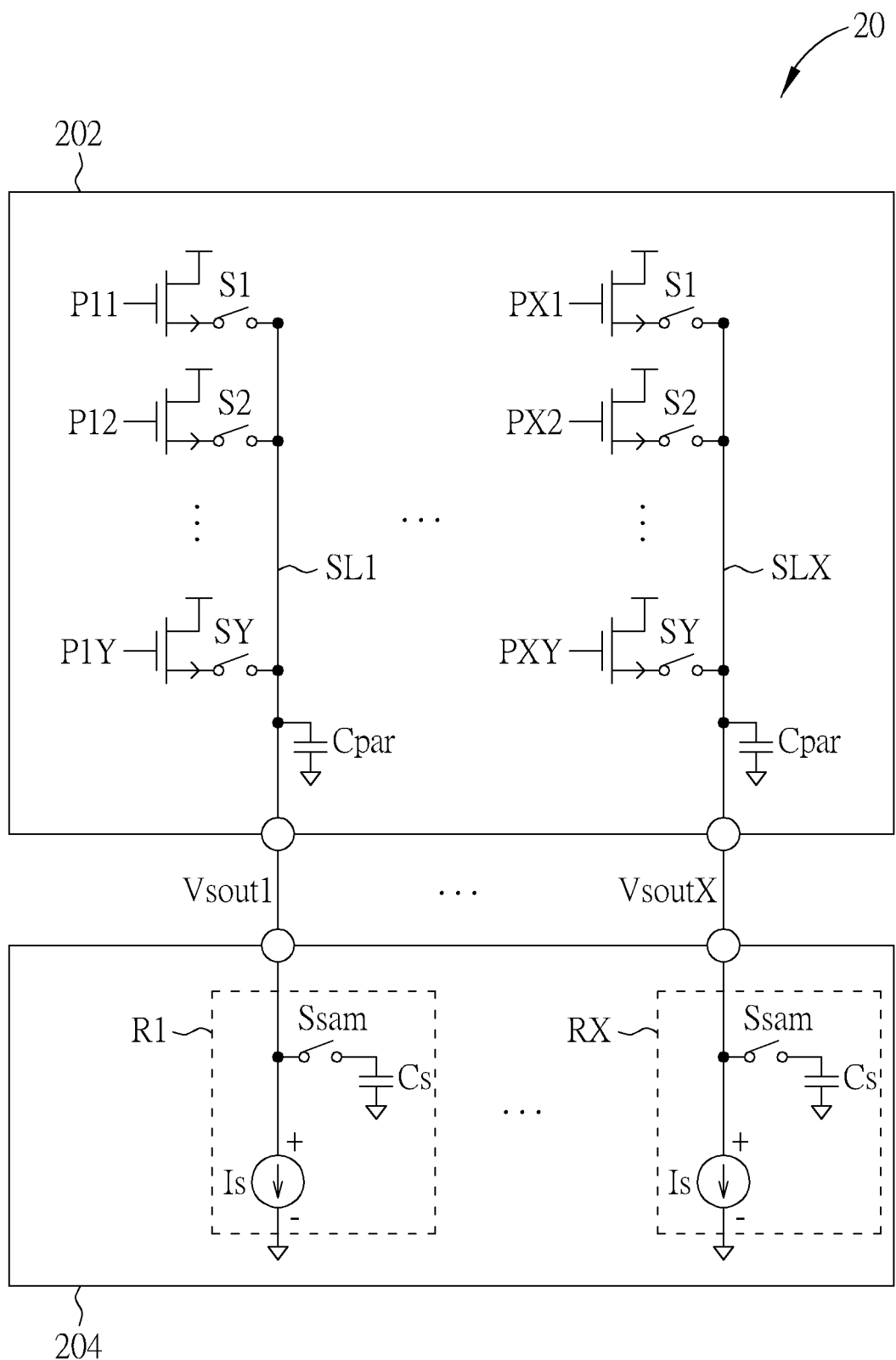
FIGS. 2 and 3 are schematic diagrams of an image sensing system.

Please refer to FIG. 2, which is a schematic diagram of an image sensing system 20. As shown in FIG. 2, the image sensing system 20 includes a panel 202 and an image sensing circuit 204. The panel 202 may include a plurality of sensing pixels arranged as an array. Each column of sensing pixels are commonly coupled to a sensing line, and each sensing line is coupled to an input/output (I/O) pin, to be further coupled to the image sensing circuit 204. More specifically, there are X columns and Y rows of sensing pixels on the panel 202, where X and Y are positive integers. As shown in FIG. 2, each sensing pixel includes a transistor (implemented as a source follower) and a switch, and a photodiode for performing optical sensing may further be included in each sensing pixel but omitted in FIG. 2 for brevity. In detail, the first column of sensing pixels P11-P1Y are commonly coupled to the sensing line SL1, and the X-th column of sensing pixels PX1-PXY are commonly coupled to the sensing line SLX. The switches in the sensing pixels are turned on in sequence through switching signals S1-SY, to scan the sensing pixels row by row to output the image sensing voltages to the image sensing circuit 204.

The image sensing circuit 204 may include a plurality of readout circuits R1-RX, each of which coupled to a sensing line SL1-SLX, respectively, with one-to-one mapping. Each readout circuit R1-RX includes a storage capacitor Cs, a sampling switch Ssam and a current source Is. The readout circuits R1-RX are configured to receive image sensing voltages through the corresponding sensing lines. For example, if the image sensing voltages of the n-th row of sensing pixels need to be read out, the switches at the n-th row of sensing pixels will be turned on, and the image sensing voltages are forwarded to the sensing lines SL1-SLX to be served as the sensing voltages Vsout1-VsoutX, respectively. The readout circuits R1-RX can thereby sample the sensing voltages Vsout1-VsoutX. In detail, the sampling switch Ssam may be turned on to forward the sensing voltages Vsout1-VsoutX, so that the sensing voltages Vsout1-VsoutX may be stored in the storage capacitor Cs and then forwarded to follow-up circuits such as the AFE circuit and ADC. By scanning the sensing pixels row by row, the readout circuits R1-RX may obtain the sensing voltages of the entire image frame after the scanning of all sensing pixels is completed. Alternatively, as for fingerprint image sensing, if the image sensing circuit 204 is able to obtain the position information of the touch finger, it may obtain an image frame by only scanning partial rows and/or partial columns of sensing pixels based on the position information.

During the image readout process, the sensing voltage Vsout1-VsoutX on each sensing line SL1-SLX may rise or fall following the voltage signals received from each row of sensing pixels, respectively. Therefore, the parasitic capacitors Cpar on each sensing line SL1-SLX should be charged or discharged during each voltage readout cycle, causing that the variations of the sensing voltages Vsout1-VsoutX should follow an exponential function as described below:

$$Vsout = \Delta V \times (1 - e^{-\frac{t}{\tau}});$$

wherein Vsout may be any of the sensing voltages Vsout1-VsoutX, $\Delta V$ represents the difference of two consecutive voltages on the sensing line (i.e., the image sensing voltages of two adjacent sensing pixels to be outputted through the same sensing line), t refers to the time, and $\tau$ refers to the time constant determined according to the parasitic capacitance and resistance of the sensing line.

As mentioned above, the circuit elements of the sensing pixels are implemented with the TFT process having worse performance, and thus the driving capability of the source follower in the sensing pixels may be weaker. In such a situation, it may require a longer time to ensure that the sensing voltage Vsout may converge to its target value. Otherwise, the sampled sensing voltage Vsout may be dependent to its previous value, resulting in an error on the output sensing voltage. Since the fingerprint sensing pixels are spread over the entire panel, the sensing lines may be quite long and the parasitic capacitors Cpar may have a non-negligible capacitance value; hence, there may not be sufficient time to settle the sensing voltage Vsout in each voltage readout cycle. A pre-charge scheme may be applied to improve the settling time of the sensing voltage Vsout, as described below.

Figure 3:
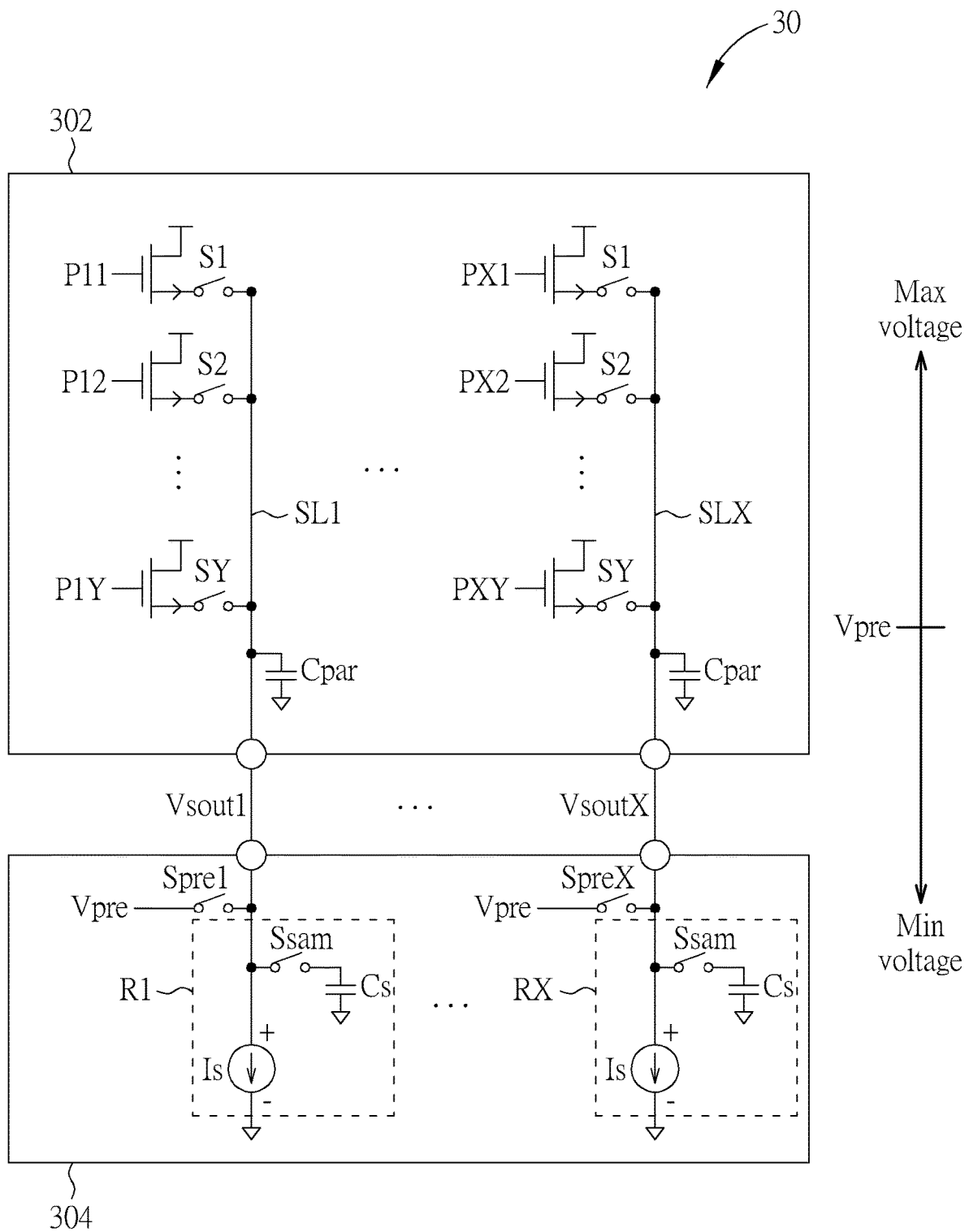

Please refer to FIG. 3, which is a schematic diagram of an image sensing system 30. As shown in FIG. 3, the image sensing system 30 includes a panel 302 and an image sensing circuit 304. The circuit structure of the panel 302 is identical to the circuit structure of the panel 202, so signals and elements having similar functions are denoted by the same symbols. The circuit structure of the image sensing circuit 304 is also identical to the circuit structure of the image sensing circuit 204, except that the image sensing circuit 304 further includes a plurality of pre-charge switches Spre1-SpreX. Each of the pre-charge switches Spre1-SpreX is coupled to one of the readout circuits R1-RX, respectively. The pre-charge switches Spre1-SpreX allow the sensing lines SL1-SLX to be pre-charged to a specific pre-charge voltage Vpre before the sensing lines SL1-SLX receive the sensing voltages Vsout1-VsoutX. The pre-charge voltage Vpre may be, for example, a medium voltage between the maximum and minimum possible voltages operable by the back-end circuitry such as the AFE circuit and ADC. In such a situation, the sensing voltages Vsout1-VsoutX received by the readout circuits R1-RX may be independent from their previous sensing voltages, and the maximum possible settling voltage in each voltage readout cycle may be reduced by half.

However, due to the trend of increasing size of panels, the parasitic capacitance and resistance on the sensing lines may become larger and larger, and the settling time of the sensing voltages may still be insufficient. Meanwhile, the variations of the time constants on different sensing lines and the variations of characteristics of the source followers in the sensing pixels may also become larger due to process mismatch, such that the charging speed of the sensing voltages on different sensing lines may be different, resulting in an error on the sensing voltages obtained by the readout circuits R1-RX if the sensing voltages are sampled before being converged to their target values. As mentioned above, the circuit elements of the sensing pixels on the panel 302 are implemented with the TFT process, which may usually have a larger process mismatch or deviation up to 20%.

The present invention provides a novel image sensing circuit and readout circuits capable of pre-charging the sensing lines to an appropriate pre-charge voltage such as an average voltage of the image sensing voltages, in order to significantly reduce the settling time of the sensing voltages and thereby improve the error problem caused by large parasitic capacitance, insufficient settling time and/or process mismatch.

Figure 4:
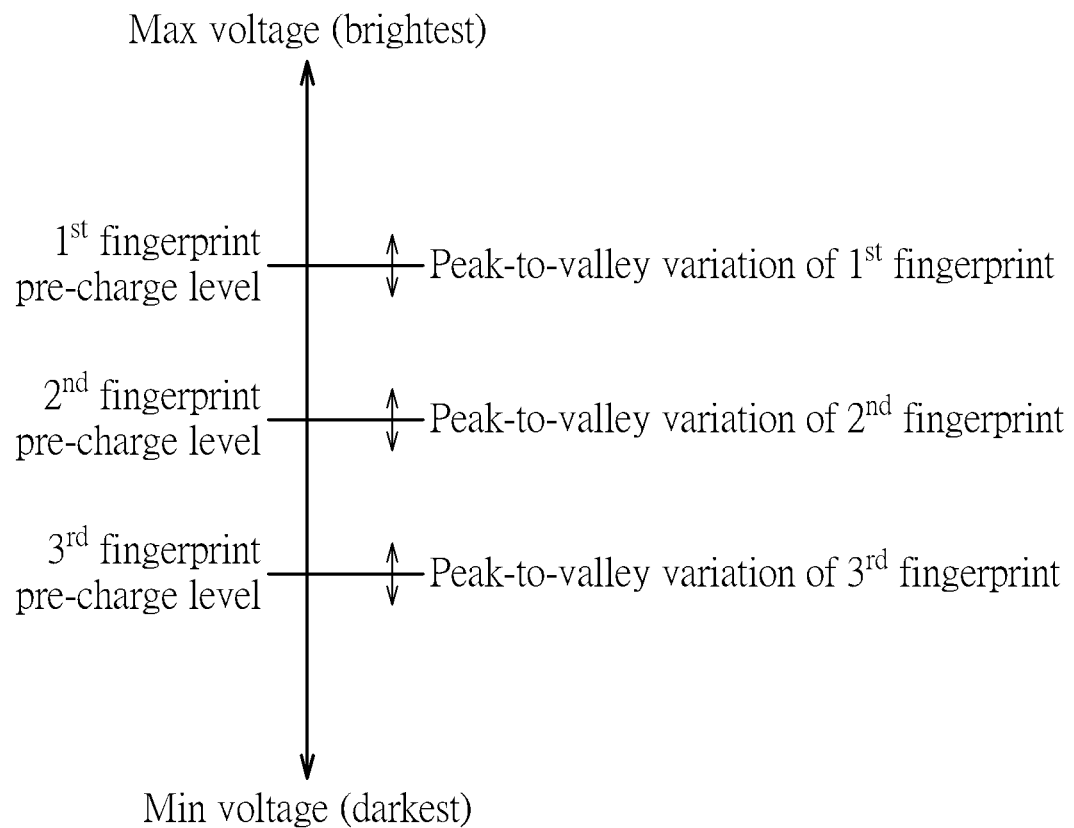
FIG. 4 illustrates possible sensing voltages corresponding to different fingers between the maximum and minimum sensing voltages.

In general, the image sensing circuit of the present invention is capable of receiving and processing a wide range of sensing voltages, which correspond to a large variety of brightness levels. FIG. 4 illustrates possible sensing voltages corresponding to different fingers between the maximum and minimum sensing voltages (the brightest and the darkest levels) received and processed by the image sensing circuit. As shown in FIG. 4, although the voltages receivable by the image sensing circuit have a wide range, the actually received sensing voltages of a touch finger may be within a small range corresponding to the peak-to-valley variation of the fingerprint. If the average voltage of the fingerprint sensing voltages corresponding to a touch finger is obtained in advance and the sensing lines are pre-charged to this average voltage, the pre-charge voltage may be close to any of the sensing voltages forwarded through the sensing lines; hence, the settling time of the sensing voltages may be significantly reduced.

For example, as shown in FIG. 4, the $1^{st}$ fingerprint image may correspond to a higher brightness in average, and thus the sensing lines are pre-charged to a higher voltage before the sensing voltages corresponding to the $1^{st}$ fingerprint image are received by the image sensing circuit. The $2^{nd}$ fingerprint image may correspond to a medium brightness in average, and thus the sensing lines are pre-charged to a medium voltage before the sensing voltages corresponding to the $2^{nd}$ fingerprint image are received by the image sensing circuit. The $3^{rd}$ fingerprint image may correspond to a lower brightness in average, and thus the sensing lines are pre-charged to a lower voltage before the sensing voltages corresponding to the $3^{rd}$ fingerprint image are received by the image sensing circuit. The difference of brightness between different fingerprint images may be resulted from various causes such as environmental luminance, finger's color and temperature. Regardless of how and why the brightness is different, the image sensing circuit only needs to acquire the average voltage of the fingerprint sensing voltages or any other voltage representing the values of the fingerprint sensing voltages, and then pre-charge the sensing lines to the desired voltage. Note that as for different fingerprint images sensed on the panel, the obtained pre-charge voltage for the image sensing voltages may be different. As for the fingerprint images received from the same finger at different times, it is also possible that the obtained pre-charge voltages may be different.

Figure 5:
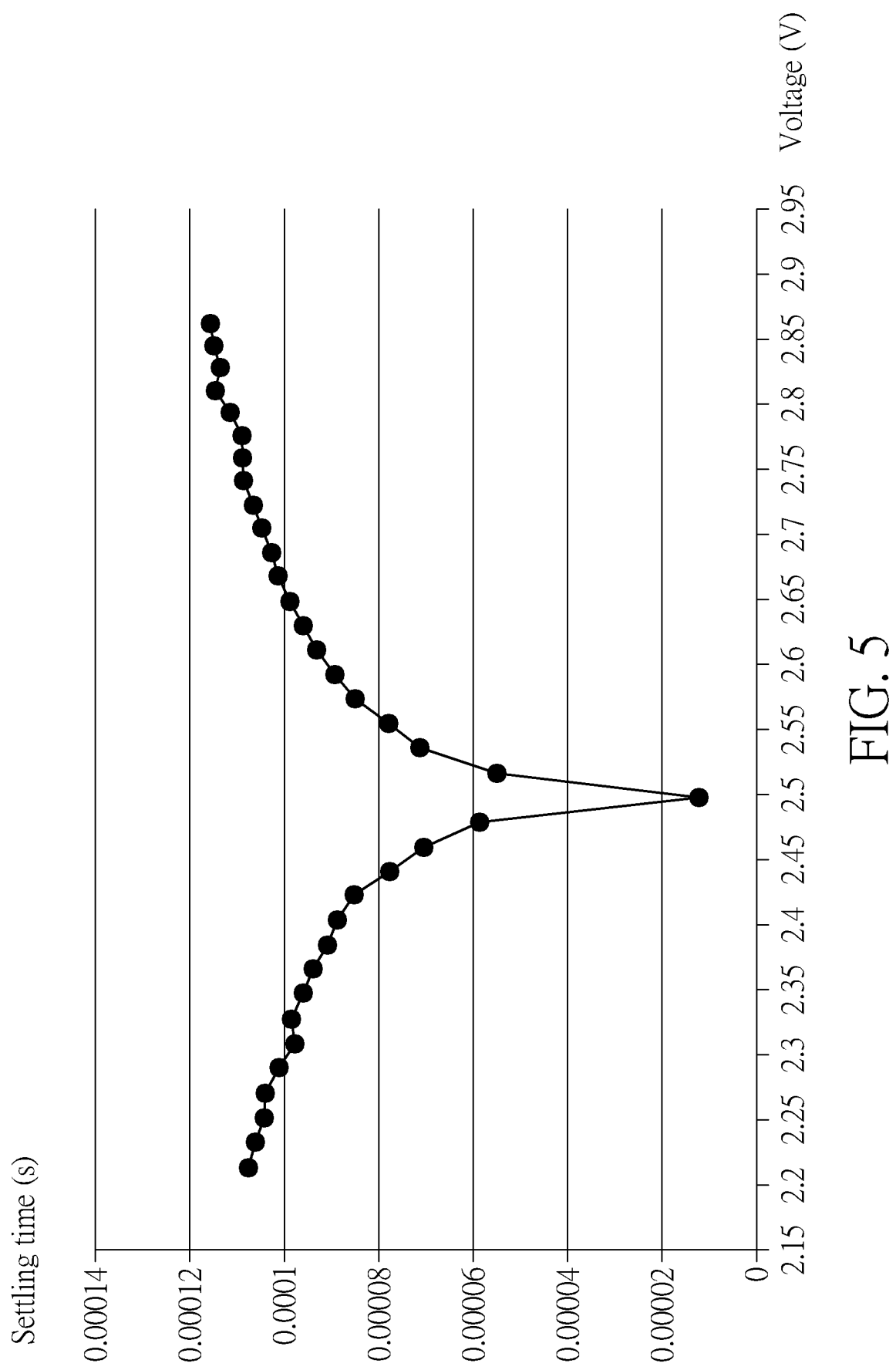
FIG. 5 illustrates a simulation result showing the time required for the sensing voltage to be converged to its target voltage.

FIG. 5 illustrates a simulation result showing the time required for the sensing voltage to be converged to its target voltage, where the pre-charge voltage is configured to 2.5 V, and the sensing voltages outputted from the panel range from 2.2 V to 2.8 V. More specifically, FIG. 5 shows the settling time allowing the sensing voltage to be converged to within 1 mV apart from its target voltage. As can be seen in FIG. 5, the settling time may be shortened if the average voltage of fingerprint is acquired in advance and the sensing lines are pre-charged to the average voltage.

Figure 6:
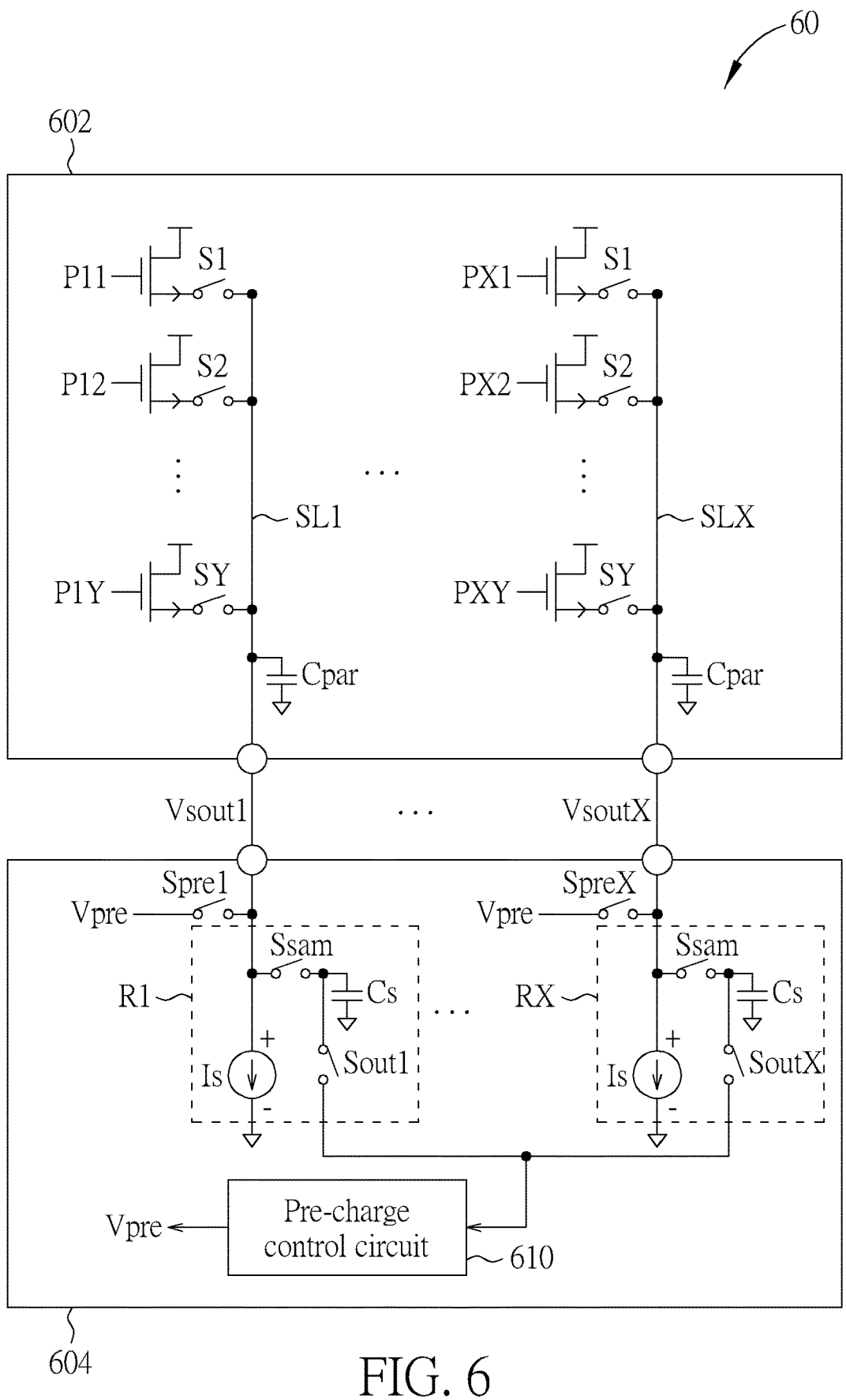
FIG. 6 is a schematic diagram of an image sensing system according to an embodiment of the present invention.

Please refer to FIG. 6, which is a schematic diagram of an image sensing system 60 according to an embodiment of the present invention. As shown in FIG. 6, the image sensing system 60 includes a panel 602 and an image sensing circuit 604. The circuit structure of the panel 602 is identical to the circuit structure of the panel 302, so signals and elements having similar functions are denoted by the same symbols. The circuit structure of the image sensing circuit 604 is also identical to the circuit structure of the image sensing circuit 304 and thus the same symbols are applied, except that the image sensing circuit 604 further includes a pre-charge control circuit 610. The pre-charge control circuit 610 may calculate the pre-charge voltage Vpre based on the received sensing voltages Vsout1-VsoutX. In an exemplary embodiment, the pre-charge control circuit 610 may average the received sensing voltages Vsout1-VsoutX to obtain the pre-charge voltage Vpre. Subsequently, the pre-charge control circuit 610 may output the pre-charge voltage Vpre to pre-charge the sensing lines SL1-SLX before the readout circuits R1-RX receive the sensing voltages Vsout1-VsoutX from the sensing lines SL1-SLX.

As shown in FIG. 6, the image sensing circuit 604 may further include a plurality of output switches Sout1-SoutX, where each of the output switches Sout1-SoutX is coupled between the pre-charge control circuit 610 and a readout circuit among the readout circuits R1-RX. Through the control of the output switches Sout1-SoutX, the pre-charge control circuit 610 may selectively receive voltages from at least one of the readout circuits R1-RX. In addition, in the image sensing circuit 604, the pre-charge switches Spre1-SpreX may further be coupled to the pre-charge control circuit 610, so that the pre-charge voltage Vpre calculated and determined by the pre-charge control circuit 610 may be forwarded to the sensing lines SL1-SLX through the pre-charge switches Spre1-SpreX, respectively.

Figure 7:
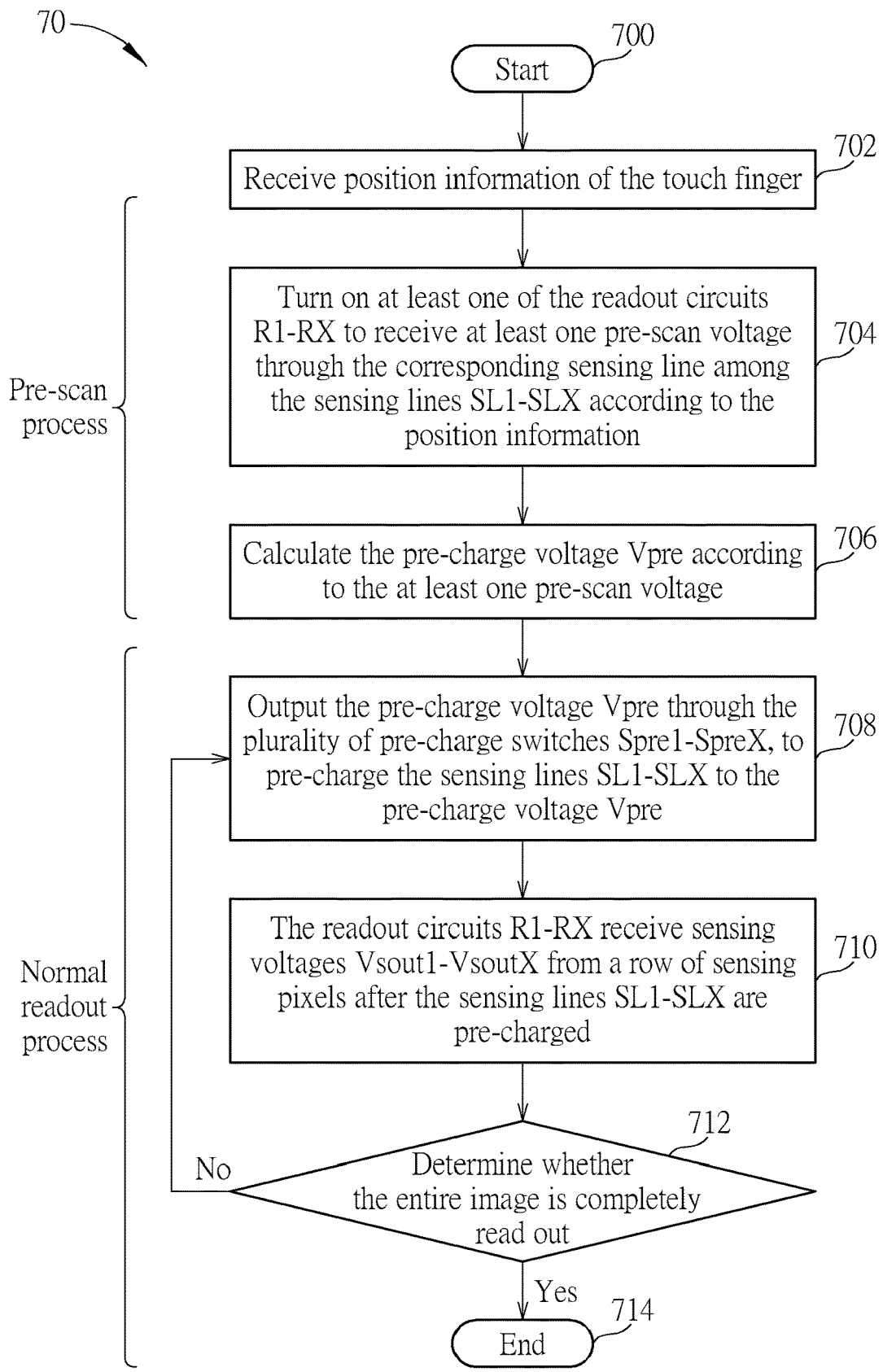
FIG. 7 is a flowchart of an image sensing process according to an embodiment of the present invention.

Please refer to FIG. 7, which is a flowchart of an image sensing process 70 according to an embodiment of the present invention. The image sensing process 70 may be realized in a fingerprint image sensing circuit such as the image sensing circuit 604 shown in FIG. 6. As shown in FIG. 7, the image sensing process 70 includes the following steps:

Step 700: Start.

Step 702: Receive position information of the touch finger.

Step 704: Turn on at least one of the readout circuits R1-RX to receive at least one pre-scan voltage through the corresponding sensing line among the sensing lines SL1-SLX according to the position information.

Step 706: Calculate the pre-charge voltage Vpre according to the at least one pre-scan voltage.

Step 708: Output the pre-charge voltage Vpre through the plurality of pre-charge switches Spre1-SpreX, to pre-charge the sensing lines SL1-SLX to the pre-charge voltage Vpre.

Step 710: The readout circuits R1-RX receive sensing voltages Vsout1-VsoutX from a row of sensing pixels after the sensing lines SL1-SLX are pre-charged.

Step 712: Determine whether the entire image is completely read out. If yes, go to Step 714; otherwise, go to Step 708.

Step 714: End.

In the image sensing process 70, the steps may be generally classified into a pre-scan process and a normal readout process. A fingerprint sensing operation for a panel touched by a finger is taken as an example. During the pre-scan process, the image sensing circuit 604 first receives the position information of the touch finger (Step 702). The position information may indicate a coordinate point or a specific area representative of the finger's position. In an embodiment, the specific area representative of the finger's position may be an area covered by the center region of the finger.

Subsequently, at least one of the readout circuits R1-RX in the image sensing circuit 604 may be turned on, to receive at least one pre-scan voltage through the corresponding sensing line SL1-SLX according to the position information of the touch finger (Step 704). More specifically, after the finger's position information is obtained, the image sensing circuit 604 may determine the specific area representative of the finger's position, and thereby determine that at least one of the readout circuits R1-RX is coupled to the sensing pixel(s) in the specific area. Therefore, the at least one readout circuit may be configured to receive the pre-scan voltage(s) from the sensing pixel(s) in the specific area, and then forward the pre-scan voltage(s) to the pre-charge control circuit 610.

Please note that the position information of the touch finger may be received from a touch module or touch sensing circuit for the panel 602. In an embodiment, the information may indicate the center region of the finger; hence, the pre-scan voltage(s) may be received from the sensing pixels covered by the center region of the finger. In general, the average voltage of fingerprint sensing voltages sensed by the sensing pixels under the center region of the finger may be approximately equal to the average value of fingerprint sensing voltages sensed by the sensing pixels under the entire finger. In order to accelerate the acquisition of the average voltage, it is preferable to receive the pre-scan voltages only from the area representative of the finger, e.g., the center region of the finger. In such a situation, the output switches Sout1-SoutX may be controlled to selectively forward the pre-scan voltage(s) to the pre-charge control circuit 610.

In addition, in order to obtain an accurate average voltage during the pre-scan process, the pre-scan operation is provided with sufficient settling time for the readout circuits R1-RX to receive the pre-scan voltages. This settling time may be longer than the settling time for the readout circuits R1-RX to receive the sensing voltages Vsout1-VsoutX in the normal readout operation. As for the pre-scan operation, the settling time may be extended to ensure that the pre-scan voltages on the sensing lines are converged to the accurate values before being sampled by the readout circuits. With the accurate pre-scan voltages, the calculated average voltage may also be accurate.

Therefore, by averaging the received pre-scan voltage(s), the pre-charge control circuit 610 may calculate and obtain the pre-charge voltage Vpre (Step 706); that is, the pre-charge voltage Vpre may be equal to the average of the pre-scan voltage(s). Subsequently, the image sensing process 70 enters the normal readout process. The pre-charge control circuit 610 may output the pre-charge voltage Vpre through the pre-charge switches Spre1-SpreX, to charge the sensing lines SL1-SLX to the pre-charge voltage Vpre (Step 708).

After the sensing lines SL1-SLX are charged to the pre-charge voltage Vpre, the readout circuits R1-RX may receive the sensing voltages Vsout1-VsoutX from a row of sensing pixels through the sensing lines SL1-SLX in a voltage readout cycle (Step 710). The image sensing circuit 604 then determines whether the entire image is completely read out (Step 712). If there is still a row of sensing pixels needing to be scanned, the process will return to Step 708 to perform the pre-charge operation again and then read out the sensing voltages Vsout1-VsoutX from the next row of sensing pixels. The image sensing circuit 604 may scan row by row, until the sensing voltages Vsout1-VsoutX of an entire image are completely read out. The image sensing process 70 may be completed if all rows of sensing pixels are scanned. Alternatively, the image sensing process 70 may be completed if several rows of sensing pixels corresponding to the position covered by the finger are scanned. This is because the back-end fingerprint recognition circuit may only concern the sensing signals corresponding to the fingerprint image, and thus it is preferable to read out the sensing signals from the sensing pixels under the coverage of the finger only.

Please note that the operations of pre-charging the sensing lines SL1-SLX through the pre-charge control circuit 610 can significantly reduce the settling time of the sensing voltages Vsout1-VsoutX received from the sensing lines SL1-SLX. Since the pre-charge control circuit 610 included in the image sensing circuit 604 may be implemented with the complementary metal oxide semiconductor (CMOS) process, the pre-charge control circuit 610 may provide higher driving capability for charging the parasitic capacitors Cpar on the sensing lines SL1-SLX. As a result, the sensing lines SL1-SLX may be rapidly charged to the pre-determined pre-charge voltage Vpre, and then rapidly charged or discharged to the fingerprint sensing voltages if the pre-charge voltage Vpre is equal or close to the average voltage of the fingerprint sensing voltages.

Figure 8:
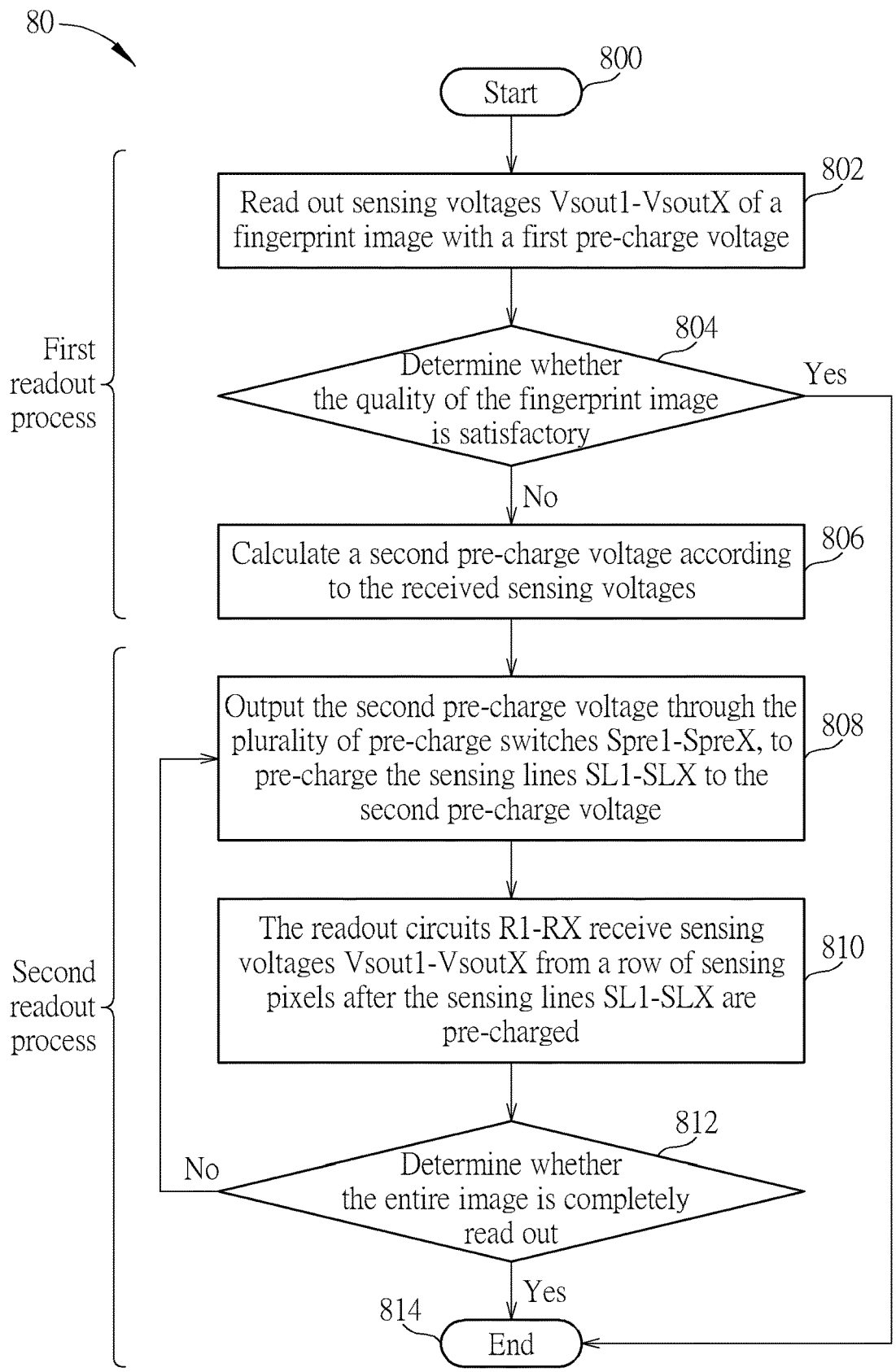
FIG. 8 is a flowchart of another image sensing process according to an embodiment of the present invention.

Please refer to FIG. 8, which is a flowchart of another image sensing process 80 according to an embodiment of the present invention. The image sensing process 80 may be realized in a fingerprint image sensing circuit such as the image sensing circuit 604 shown in FIG. 6. As shown in FIG. 8, the image sensing process 80 includes the following steps:

Step 800: Start.

Step 802: Read out sensing voltages Vsout1-VsoutX of a fingerprint image with a first pre-charge voltage.

Step 804: Determine whether the quality of the fingerprint image is satisfactory. If yes, go to Step 814; otherwise, go to Step 806.

Step 806: Calculate a second pre-charge voltage according to the received sensing voltages.

Step 808: Output the second pre-charge voltage through the plurality of pre-charge switches Spre1-SpreX, to pre-charge the sensing lines SL1-SLX to the second pre-charge voltage.

Step 810: The readout circuits R1-RX receive sensing voltages Vsout1-VsoutX from a row of sensing pixels after the sensing lines SL1-SLX are pre-charged.

Step 812: Determine whether the entire image is completely read out. If yes, go to Step 814; otherwise, go to Step 808.

Step 814: End.

In the image sensing process 80, the steps may be generally classified into a first readout process and a second readout process. During the first readout process, the image sensing circuit 604 is configured to read out sensing voltages Vsout1-VsoutX of a frame of fingerprint image based on a first pre-charge voltage (Step 802). That is, each sensing line may be pre-charged to the first pre-charge voltage before the readout operation in each voltage readout cycle. The first pre-charge voltage may be obtained by averaging the pre-scan voltage(s) in the pre-scan process as described above. Alternatively, the first pre-charge voltage may be a default pre-charge voltage or a pre-charge voltage determined in another manner.

After the sensing voltages Vsout1-VsoutX of the fingerprint image are read out, the image sensing circuit 604 may determine whether the quality of the fingerprint image is satisfactory (Step 804). For example, the image sensing circuit 604 may determine whether the fingerprint image is recognizable, or may receive an indication from the host indicating whether the fingerprint image is recognizable. The image sensing process 80 ends if the quality of the fingerprint image is determined to be satisfactory. If the quality of the fingerprint image is not satisfactory, the second readout process may be required.

Subsequently, the pre-charge control circuit 610 may calculate a second pre-charge voltage according to the sensing voltages Vsout1-VsoutX received in the first readout process (Step 806). Similarly, the second pre-charge voltage may also be calculated through averaging, where the sensing voltages Vsout1-VsoutX received in the first readout process may be regarded as the pre-scan voltages for the average operations of the second readout process. The pre-charge control circuit 610 then outputs the second pre-charge voltage through the plurality of pre-charge switches Spre1-SpreX, to pre-charge the sensing lines SL1-SLX to the second pre-charge voltage (Step 808). Subsequently, the readout circuits R1-RX may receive the sensing voltages Vsout1-VsoutX from a row of sensing pixels through the sensing lines SL1-SLX in a voltage readout cycle (Step 810), and the image sensing circuit 604 then determines whether the entire image is completely read out (Step 812). The detailed operations of these steps are similar to Steps 708, 710 and 712 of the image sensing process 70 as described above, and will not be repeated herein.

In an embodiment, the image sensing process 80 may be performed following the image sensing process 70; that is, if the fingerprint image obtained through the image sensing process 70 is not satisfactory, the second readout process in the image sensing process 80 may further be performed to obtain a more accurate fingerprint image. Alternatively or additionally, the image sensing process 80 may be performed repeatedly; that is, if the fingerprint image obtained through the second readout process is still unsatisfactory, the process may further go on to the third readout process, the fourth readout process, etc., until the obtained fingerprint image becomes satisfactory and/or recognizable.

Please note that the embodiments of the present invention aim at providing an image sensing circuit and method capable of improving the settling time for reading out image sensing voltages. Those skilled in the art may make modifications and alternations accordingly. For example, in the above embodiments, the image sensing circuit 604 and the readout circuits R1-RX therein are configured to receive fingerprint sensing signals from a panel having an active pixel sensor (APS) structure. In another embodiment, the readout circuits in the image sensing circuit may be applicable to a passive pixel sensor (PPS) panel structure.

Figure 9:
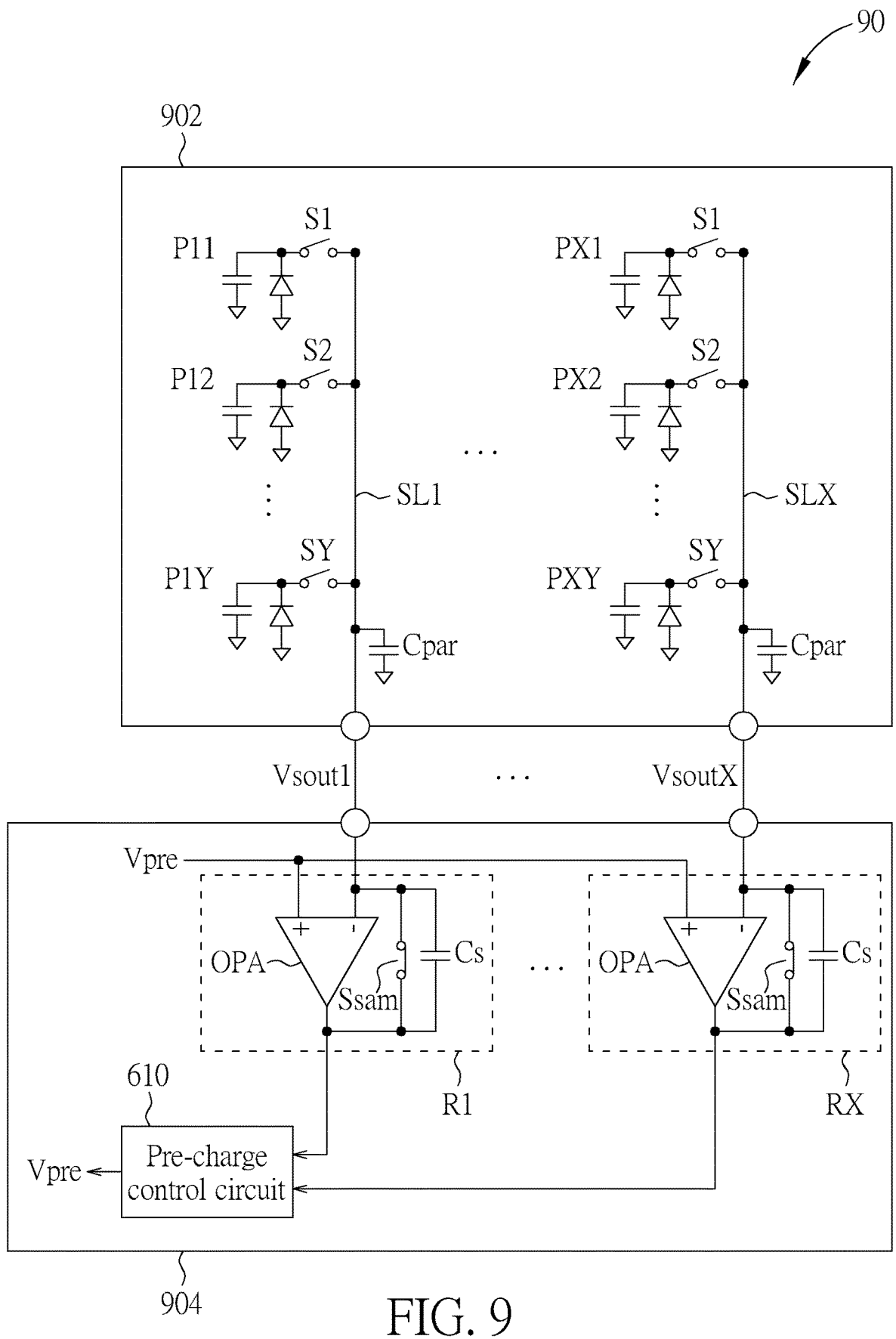
FIG. 9 is a schematic diagram of an image sensing system according to an embodiment of the present invention.

Please refer to FIG. 9, which is a schematic diagram of an image sensing system 90 according to an embodiment of the present invention. As shown in FIG. 9, the image sensing system 90 includes a panel 902 and an image sensing circuit 904. The circuit structures of the panel 902 and the image sensing circuit 904 are similar to the circuit structures of the panel 602 and the image sensing circuit 604, respectively, so signals and elements having similar functions are denoted by the same symbols. The difference between the panel 902 and the panel 602 is that, the sensing pixels P11-PXY in the panel 902 have the PPS structure instead of the APS structure. In such a situation, each sensing pixel has a capacitor, a photodiode and a switch without the usage of source follower. Correspondingly, each of the readout circuits R1-RX of the image sensing circuit 904 includes an operational amplifier OPA capable of reading out fingerprint sensing voltages from the sensing pixels of the PPS.

In detail, in each of the readout circuits R1-RX, the positive input terminal of the operational amplifier OPA is coupled to the pre-charge control circuit 610, for receiving the pre-charge voltage Vpre from the pre-charge control circuit 610. The negative input terminal of the operational amplifier OPA is coupled to the corresponding sensing line SL1-SLX. The virtual short-circuit between input terminals of the operational amplifier OPA makes the sensing lines SL1-SLX charged to the pre-charge voltage Vpre before the readout circuits R1-RX receive the sensing voltages Vsout1-VsoutX from the sensing lines SL1-SLX. The operations of the image sensing processes 70 and 80 described above are also applicable to the image sensing circuit 904 for the PPS panel.

In an embodiment, the AFE circuit has a differential input structure, which is configured to receive a sensing voltage and a reset voltage from each channel, where the actual output signal may be determined based on the difference between the reset voltage and the sensing voltage. Therefore, the image sensing circuit is requested to receive the sensing voltage based on the exposure result in the sensing pixels of the panel and also receive the reset voltage without exposure. In such a situation, the image sensing circuit may be configured with two pre-charge voltages, which are used to pre-charge the sensing lines for reception of the sensing voltage and the reset voltage, respectively.

Figure 10:
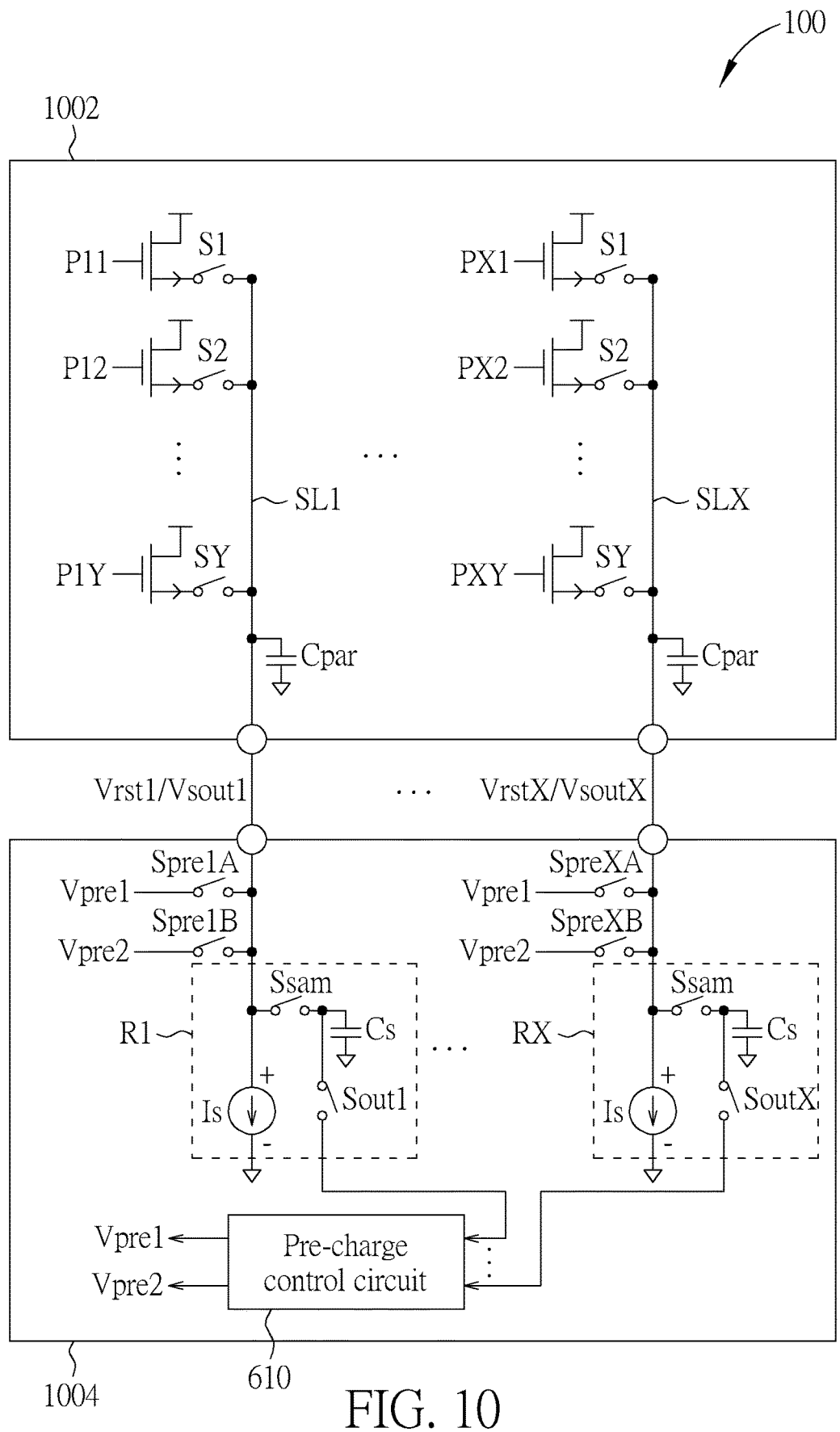
FIG. 10 is a schematic diagram of an image sensing system according to an embodiment of the present invention.

Please refer to FIG. 10, which is a schematic diagram of an image sensing system 100 according to an embodiment of the present invention. As shown in FIG. 10, the image sensing system 100 includes a panel 1002 and an image sensing circuit 1004. The circuit structures of the panel 1002 and the image sensing circuit 1004 are similar to the circuit structures of the panel 602 and the image sensing circuit 604, respectively, so signals and elements having similar functions are denoted by the same symbols. The difference between the image sensing circuit 1004 and the image sensing circuit 604 is that, in the image sensing circuit 1004, each readout circuit R1-RX is coupled to two pre-charge switches. For example, the readout circuit R1 is coupled to pre-charge switches Spre1A and Spre1B, for receiving a first pre-charge voltage Vpre1 and a second pre-charge voltage Vpre2 through the pre-charge switches Spre1A and Spre1B, respectively. The readout circuit RX is coupled to pre-charge switches SpreXA and SpreXB, for receiving the first pre-charge voltage Vpre1 and the second pre-charge voltage Vpre2 through the pre-charge switches SpreXA and SpreXB, respectively. Correspondingly, the pre-charge control circuit 610 is configured to generate and output the two pre-charge voltages Vpre1 and Vpre2. Alternatively, there may be two pre-charge control circuits included in the image sensing circuit 1004, where one of the pre-charge control circuits is configured to generate the first pre-charge voltage Vpre1 and the other is configured to generate the second pre-charge voltage Vpre2.

In this embodiment, the image sensing system 100 may operate in a reset mode and then enter a sensing mode. In the reset mode, the image sensing circuit 1004 may receive reset voltages Vrst1-VrstX from the panel 1002, e.g., through the sensing lines SL1-SLX. Before the reset voltages Vrst1-VrstX are received, the image sensing circuit 1004 may receive pre-scan voltage(s) through at least one of the readout circuits R1-RX. The pre-scan voltage(s) is/are corresponding to the reset operation and may be obtained from the sensing pixels without performing exposure and received through at least one of the sensing lines SL1-SLX. The pre-charge control circuit 610 then calculates the first pre-charge voltage Vpre1 for the reset operation based on the received pre-scan voltage(s), e.g., averages the received pre-scan voltage(s) to generate the first pre-charge voltage Vpre1. Therefore, the pre-charge control circuit 610 may output the first pre-charge voltage Vpre1 through the pre-charge switches Spre1A-SpreXA, to charge the sensing lines SL1-SLX to the first pre-charge voltage Vpre1 before the image sensing circuit 1004 receives the reset voltages Vrst1-VrstX from the panel 1002.

Subsequently, in the sensing mode following the reset mode, the image sensing circuit 1004 may receive the sensing voltages Vsout1-VsoutX from the panel 1002, e.g., through the sensing lines SL1-SLX. Before the sensing voltages Vsout1-VsoutX are received, the image sensing circuit 1004 may receive pre-scan voltage(s) through at least one of the readout circuits R1-RX. The pre-scan voltage(s) is/are corresponding to the sensing operation and may be obtained from the sensing pixels performing exposure for image sensing and received through at least one of the sensing lines SL1-SLX. The pre-charge control circuit 610 then calculates the second pre-charge voltage Vpre2 for the sensing operation based on the received pre-scan voltage(s), e.g., averages the received pre-scan voltage(s) to generate the second pre-charge voltage Vpre2. Therefore, the pre-charge control circuit 610 may output the second pre-charge voltage Vpre2 through the pre-charge switches Spre1B-SpreXB, to charge the sensing lines SL1-SLX to the second pre-charge voltage Vpre2 before the image sensing circuit 1004 receives the sensing voltages Vsout1-VsoutX from the panel 1002.

Therefore, the pre-scan process of the image sensing process 70 may be applicable to the reset mode, allowing the sensing lines SL1-SLX to be pre-charged to the first pre-charge voltage Vpre1 before reception of the reset voltages Vrst1-VrstX, in order to reduce the settling time of the reset voltages Vrst1-VrstX and accelerate the readout speed for the reset voltages Vrst1-VrstX during the normal readout process. The pre-scan process of the image sensing process 70 may also be applicable to the sensing mode, allowing the sensing lines SL1-SLX to be pre-charged to the second pre-charge voltage Vpre2 before reception of the sensing voltages Vsout1-VsoutX, in order to reduce the settling time of the sensing voltages Vsout1-VsoutX and accelerate the readout speed for the sensing voltages Vsout1-VsoutX during the normal readout process. Similarly, the first and second readout processes of the image sensing process 80 are applicable to reception of both the reset voltages Vrst1-VrstX and the sensing voltages Vsout1-VsoutX. The detailed implementations and operations may be understood by those skilled in the art based on the above descriptions, and will not be narrated herein.

Figure 11:
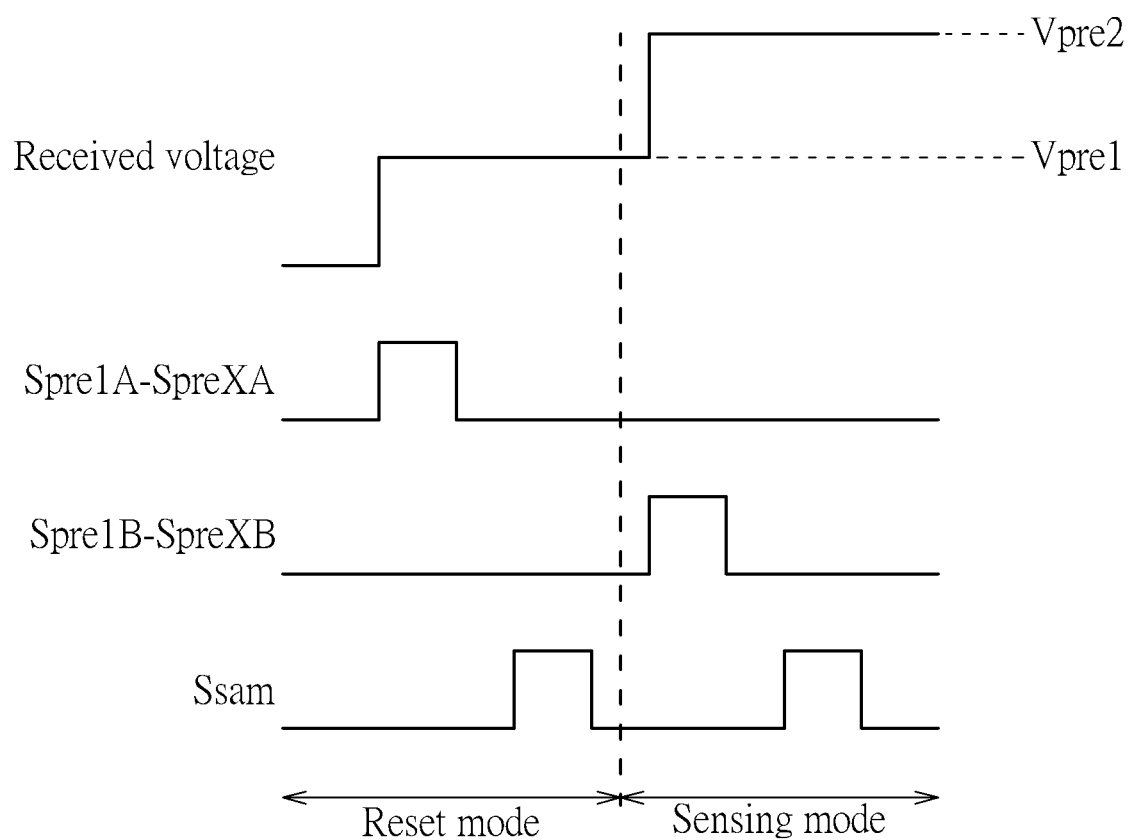
FIG. 11 illustrates waveforms associated with operations of the image sensing circuit shown in FIG. 10.

FIG. 11 illustrates the waveforms associated with operations of the image sensing circuit 1004, where the operations include a reset operation in the reset mode and a sensing operation in the sensing mode. More specifically, FIG. 11 illustrates the voltage received from the panel 1002 (which may be any of the voltages on the sensing lines SL1-SLX), and the operations of the pre-charge switches Spre1A-SpreXA and Spre1B-SpreXB and the sampling switch Ssam. In the reset mode, the pre-charge switches Spre1A-SpreXA are turned on, and the sensing lines SL1-SLX are pre-charged to the first pre-charge voltage Vpre1. The image sensing circuit 1004 then receives the reset voltages Vrst1-VrstX (which may usually be close to the first pre-charge voltage Vpre1) by sampling the reset voltages Vrst1-VrstX through the sampling switch Ssam. Subsequently, in the sensing mode, the pre-charge switches Spre1B-SpreXB are turned on, and the sensing liens SL1-SLX are pre-charged to the second pre-charge voltage Vpre2. The image sensing circuit 1004 then receives the sensing voltages Vsout1-VsoutX (which may usually be close to the second pre-charge voltage Vpre2) by sampling the sensing voltages Vsout1-VsoutX through the sampling switch Ssam.

Figure 12:
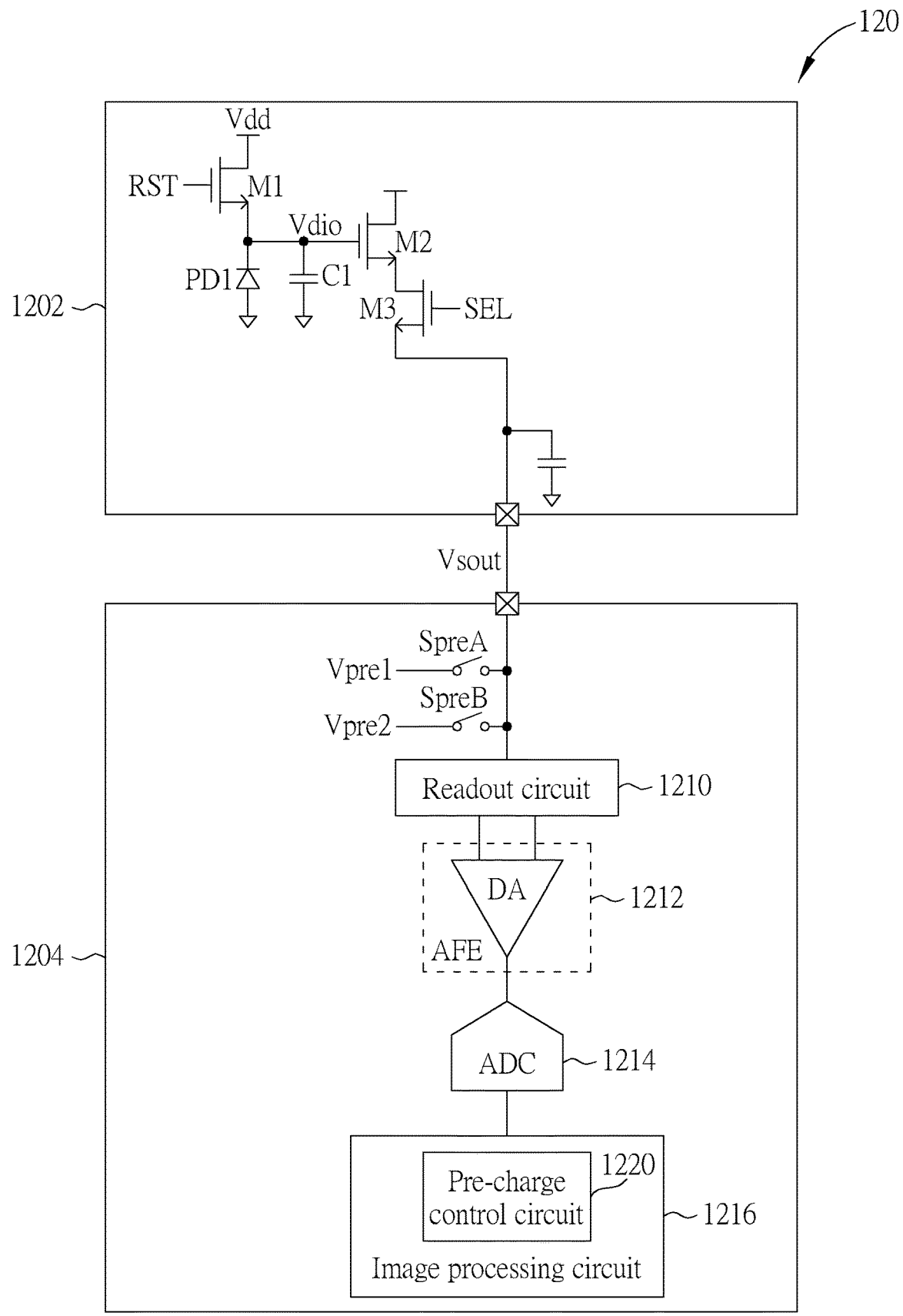
FIG. 12 is a schematic diagram of an image sensing system according to an embodiment of the present invention.

Please refer to FIG. 12, which is a schematic diagram of an image sensing system 120 according to an embodiment of the present invention. FIG. 12 illustrates the circuit structures and implementations of the fingerprint image sensing circuit in more detail. As shown in FIG. 12, the image sensing system 120 includes a panel 1202 and an image sensing circuit 1204. The panel 1202 may include a fingerprint sensor array having a great number of sensing pixels spread over the entire screen, to realize in-display fingerprint sensing on any place of the screen. Each sensing pixel may include a photodiode PD1, a capacitor C1 and transistors M1-M3. Note that there may be multiple sensing pixels having similar structure arranged as an array on the panel 1202, but only one sensing pixel is illustrated in FIG. 12 for simplicity.

In each sensing pixel, the photodiode PD1 is configured to perform exposure to generate electric charges based on the sensed light. The capacitor C1 is configured to store the electric charges generated from the photodiode PD1. A voltage Vdio on the capacitor C1 may reflect the exposure information received by the photodiode PD1. The transistor M1 is served as a reset transistor, which is controlled via a reset signal RST. The transistor M2 is served as a source follower, for forwarding the voltage Vdio that carries the exposure information to the sensing line. The transistor M3 is served as a select transistor, which is controlled via a select signal SEL. In general, a column of sensing pixels may be commonly coupled to a sensing line, and the transistor M3 of the sensing pixels is turned on row by row under control of the select signal SEL.

The image sensing circuit 1204 may include a readout circuit 1210, an AFE circuit 1212, an ADC 1214 and an image processing circuit 1216. The readout circuit 1210 may receive a sensing voltage Vsout and a reset voltage Vrst from the corresponding sensing pixel. In an embodiment, the readout circuit 1210 may be implemented as a correlated double sampling (CDS) circuit, which is capable of sampling the sensing voltage Vsout on the sensing line in a sensing period and sampling the reset voltage Vrst on the sensing line in a reset period. The AFE circuit 1212 then receives the sensing voltage Vsout in the sensing period and receives the reset voltage Vrst in the reset period, and performs amplification on the received voltages. The AFE circuit 1212 may include a differential amplifier (DA), which may generate an image sensing signal according to the sensing voltage Vsout and the reset voltage Vrst. More specifically, the DA may generate the image sensing signal by subtracting the reset voltage Vrst from the sensing voltage Vsout. The subtraction of the reset voltage Vrst may remove the noises or offsets generated in respective sensing pixel, such as the offset voltage of the source follower (i.e., the transistor M2). The ADC 1214 thereby converts the received image sensing signal into digital data, to be processed by the follow-up image processing circuit 1216. The image processing circuit 1216 may further forward the digital data to a host or core processor for fingerprint recognition.

The image processing circuit 1216 may further include a pre-charge control circuit 1220. The pre-charge control circuit 1220 operates similarly as the pre-charge control circuit 610 in the above embodiments. More specifically, the pre-charge control circuit 1220 may output a pre-charge voltage Vpre1 or Vpre2 to pre-charge the sensing line prior to reception of the sensing voltage Vsout or the reset voltage Vrst. As for reception of the sensing voltage Vsout, the sensing line may be pre-charged to the pre-charge voltage Vpre1, which may be calculated by averaging at least one pre-scan voltage for the sensing voltage Vsout, where the at least one pre-scan voltage is received from one or more readout circuits. As for reception of the reset voltage Vrst, the sensing line may be pre-charged to the pre-charge voltage Vpre2, which may be calculated by averaging at least one pre-scan voltage for the reset voltage Vrst, where the at least one pre-scan voltage is received from one or more readout circuits.

Figure 13:
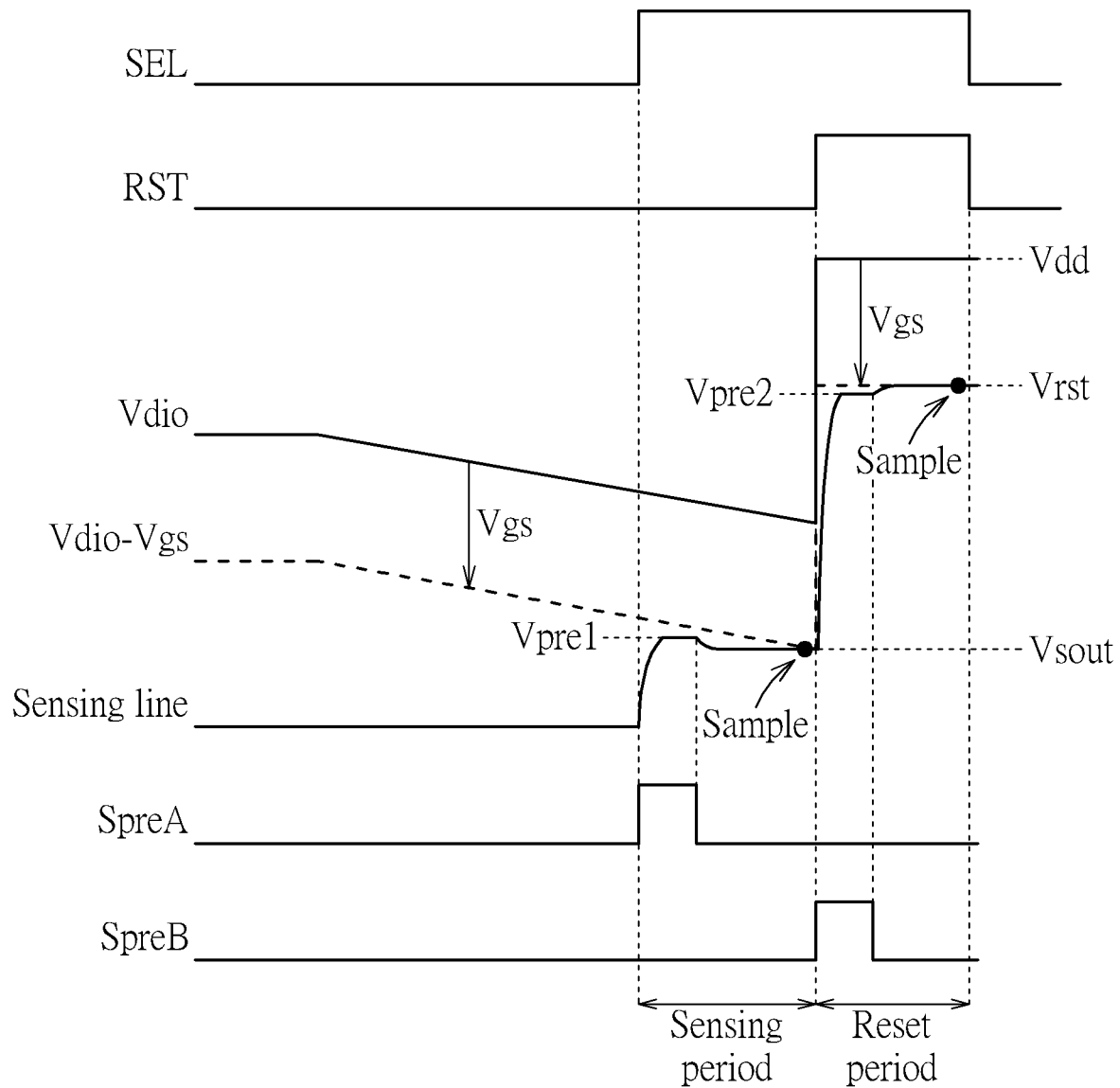
FIG. 13 illustrates waveforms associated with operations of the image sensing circuit shown in FIG. 12.

In detail, please refer to FIG. 13, which illustrates the waveforms associated with operations of the image sensing system 120 as shown in FIG. 12. The image processing circuit 1216 may output the reset signal RST and the select signal SEL to each sensing pixel, to control the operations of the sensing pixel. As shown in FIG. 13, the reset signal RST and the select signal SEL in "High" state turn on the corresponding transistor (i.e., switch), and those in "Low" state turn off the corresponding transistor. The image signals of a sensing pixel may be read out when the transistor M3 is turned on via the corresponding select signal SEL. In the sensing period, the reset transistor M1 is turned off, and the voltage Vdio gradually falls due to exposure of the photodiode PD1. The transistor M2, operated as a source follower, forwards the voltage Vdio-Vgs to the sensing line, where Vgs is the gate-to-source voltage of the transistor M2. Before sampling of the sensing voltage Vsout, the pre-charge switch SpreA may be turned on, and the sensing line may be pre-charged to the first pre-charge voltage Vpre1. In the reset period, the reset transistor M1 is turned on, and the voltage Vdio is charged to the voltage level Vdd. The transistor M2 thereby forwards the voltage Vdd-Vgs to the sensing line. Before sampling of the reset voltage Vrst, the pre-charge switch SpreB may be turned on, and the sensing line may be pre-charged to the second pre-charge voltage Vpre2.

Please note that the circuit structure of the image sensing circuit 1204 shown in FIG. 12 is merely an exemplary implementation. For example, there may be multiple channels included in the image sensing circuit 1204 and each channel has a readout circuit having similar structure for receiving voltages from a corresponding sensing line. In an embodiment, the readout circuits in multiple channels may be commonly coupled to an AFE. Alternatively, each channel may include a readout circuit and an AFE, and the AFEs in multiple channels may be commonly coupled to an ADC. Alternatively, each channel may include a readout circuit, an AFE and an ADC, and the ADCs in multiple channels may be commonly coupled to the image processing circuit. In an embodiment, the readout circuit may be integrated into the AFE circuit.

Please also note that, as for the sensing operations of a sensing pixel, the reset voltage Vrst may be received before reception of the sensing voltage Vsout, as shown in FIG. 11, or may be received after reception of the sensing voltage Vsout, as shown in FIG. 13. As long as any of the sensing voltage Vsout and the reset voltage Vrst is read out after the corresponding sensing line is pre-charged to a pre-charge voltage so as to reduce the settling time, the implementation should belong to the scope of the present invention.

To sum up, the present invention provides an image sensing circuit and method capable of improving the settling time for reading out image sensing voltages. In an embodiment, before the normal readout process, a pre-scan operation may be performed, where one or several pre-scan voltages may be received from an area of the panel representative of the finger's position such as the area covered by the center region of the finger. The pre-charge control circuit may thereby average the received pre-scan voltage(s) to obtain the pre-charge voltage. Subsequently, during each voltage readout cycle, the sensing lines may be pre-charged to the pre-charge voltage before image sensing voltages are read out. The pre-scan process of the present invention is applicable to the sensing operation for receiving the sensing voltages and also applicable to the reset operation prior to or later than the sensing operation, where reset voltages obtained without performing exposure are received during the reset operation. Therefore, the settling time of the image sensing voltages may be significantly reduced, thereby accelerating the readout speed of the fingerprint image and improving the quality of the fingerprint image.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. An image sensing circuit, comprising:
    a plurality of readout circuits, each coupled to a sensing line among a plurality of sensing lines and configured to receive a sensing voltage among a plurality of sensing voltages through the corresponding sensing line, wherein at least one of the plurality of readout circuits is further configured to receive at least one first pre-scan voltage through the corresponding sensing line prior to reception of the sensing voltage; and
    a pre-charge control circuit, coupled to the plurality of readout circuits, configured to:
        receive the at least one first pre-scan voltage from the at least one readout circuit;
        calculate a first pre-charge voltage according to the at least one first pre-scan voltage; and
        pre-charge the plurality of sensing lines to the first pre-charge voltage before the plurality of readout circuits receive the plurality of sensing voltages.

2. The image sensing circuit of claim 1, wherein the pre-charge control circuit is configured to average the at least one first pre-scan voltage to obtain the first pre-charge voltage.

3. The image sensing circuit of claim 1, wherein the plurality of sensing voltages are fingerprint sensing voltages received from a panel touched by a finger, and the at least one readout circuit is coupled to at least one sensing pixel in a specific area of the panel representative of a position of the finger.

4. The image sensing circuit of claim 3, wherein the specific area of the panel is an area covered by a center region of the finger.

5. The image sensing circuit of claim 1, further comprising:
    a plurality of output switches, each coupled between the pre-charge control circuit and one of the plurality of readout circuits, configured to selectively forward the at least one first pre-scan voltage to the pre-charge control circuit.

6. The image sensing circuit of claim 1, wherein the pre-charge control circuit is further configured to:
    calculate a second pre-charge voltage according to the plurality of sensing voltages; and
    pre-charge the plurality of sensing lines to the second pre-charge voltage before the plurality of readout circuits receive a plurality of next sensing voltages.

7. The image sensing circuit of claim 1, further comprising:
    a plurality of pre-charge switches, each coupled between the pre-charge control circuit and one of the plurality of sensing lines, configured to forward the first pre-charge voltage to the corresponding sensing line among the plurality of sensing lines.

8. The image sensing circuit of claim 1, wherein each of the plurality of readout circuits further comprises:
    an operational amplifier, comprising:
        a first input terminal, coupled to the corresponding sensing line among the plurality of sensing lines; and
        a second input terminal, coupled to the pre-charge control circuit, configured to receive the first pre-charge voltage.

9. The image sensing circuit of claim 1, wherein a settling time for the plurality of readout circuits to receive the at least one first pre-scan voltage is configured to be longer than a settling time for the plurality of readout circuits to receive the plurality of sensing voltages.

10. The image sensing circuit of claim 1, wherein the first pre-charge voltage is used for sensing a first image, and the pre-charge control circuit is further configured to calculate a second pre-charge voltage for sensing a second image, wherein the second pre-charge voltage is different from the first pre-charge voltage.

11. The image sensing circuit of claim 1, wherein each of the plurality of readout circuits is further configured to receive a reset voltage through the corresponding sensing line among the plurality of sensing lines, and the at least one readout circuit is further configured to receive at least one second pre-scan voltage through the corresponding sensing line prior to reception of the reset voltage.

12. The image sensing circuit of claim 11, wherein the pre-charge control circuit is further configured to:
    receive the at least one second pre-scan voltage from the at least one readout circuit;
    calculate a second pre-charge voltage according to the at least one second pre-scan voltage; and
    pre-charge the plurality of sensing lines to the second pre-charge voltage before the plurality of readout circuits receive the reset voltages.

13. An image sensing method for an image sensing circuit, the image sensing circuit having a plurality of readout circuits each coupled to a sensing line among a plurality of sensing lines, the image sensing method comprising:
    receiving, by at least one of the plurality of readout circuits, at least one first pre-scan voltage through a corresponding sensing line among the plurality of sensing lines;
    calculating a first pre-charge voltage according to the at least one first pre-scan voltage;
    pre-charging the plurality of sensing lines to the first pre-charge voltage; and
    receiving, by the plurality of readout circuits, a plurality of sensing voltages after the plurality of sensing lines are pre-charged.

14. The image sensing method of claim 13, wherein the step of calculating the first pre-charge voltage according to the at least one first pre-scan voltage comprises:
    averaging the at least one first pre-scan voltage to obtain the first pre-charge voltage.

15. The image sensing method of claim 13, wherein the plurality of sensing voltages are fingerprint sensing voltages received from a panel touched by a finger, and the at least one readout circuit is coupled to at least one sensing pixel in a specific area of the panel representative of a position of the finger.

16. The image sensing method of claim 15, wherein the specific area of the panel is an area covered by a center region of the finger.

17. The image sensing method of claim 13, further comprising:
    selectively forwarding the at least one first pre-scan voltage for calculation of the first pre-charge voltage through a plurality of output switches.

18. The image sensing method of claim 13, further comprising:
    calculating a second pre-charge voltage according to the plurality of sensing voltages;
    pre-charging the plurality of sensing lines to the second pre-charge voltage; and receiving, by the plurality of readout circuits, a plurality of next sensing voltages after the plurality of sensing lines are pre-charged to the second pre-charge voltage.

19. The image sensing method of claim 13, further comprising:
forwarding the first pre-charge voltage to the plurality of sensing lines through a plurality of pre-charge switches.

20. The image sensing method of claim 13, wherein each of the plurality of readout circuits further comprises an operational amplifier, wherein the operational amplifier comprises a first input terminal coupled to the corresponding sensing line among the plurality of sensing lines and a second input terminal, and the image sensing method further comprises:
receiving the first pre-charge voltage through the second input terminal of the operational amplifier.

21. The image sensing method of claim 13, wherein a settling time for the plurality of readout circuits to receive the at least one first pre-scan voltage is configured to be longer than a settling time for the plurality of readout circuits to receive the plurality of sensing voltages.

22. The image sensing method of claim 13, wherein the first pre-charge voltage is used for sensing a first image, and the image sensing method further comprises:
calculating a second pre-charge voltage for sensing a second image;
wherein the second pre-charge voltage is different from the first pre-charge voltage.

23. The image sensing method of claim 13, further comprising:
receiving, by the at least one readout circuit, at least one second pre-scan voltage through the corresponding sensing line among the plurality of sensing lines; and
receiving, by the plurality of readout circuits, a plurality of reset voltages after the plurality of sensing lines are pre-charged to the second pre-scan voltage.

24. The image sensing method of claim 23, further comprising:
calculating a second pre-charge voltage according to the at least one second pre-scan voltage; and
pre-charging the plurality of sensing lines to the second pre-charge voltage.

25. An image sensing circuit, coupled to a panel through a plurality of sensing lines, the panel having a plurality of sensing pixels, the image sensing circuit comprising:
an image processing circuit, configured to control a reset switch of a first sensing pixel among the plurality of sensing pixels to be turned on in a reset period and turned off in a sensing period;
a readout circuit, configured to receive a sensing voltage from the first sensing pixel through a corresponding sensing line among the plurality of sensing lines in the sensing period, and receive a reset voltage from the first sensing pixel through the corresponding sensing line in the reset period; and
an analog front-end (AFE) circuit, configured to generate an image sensing signal of the first sensing pixel according to the sensing voltage and the reset voltage.

26. The image sensing circuit of claim 25, wherein the image processing circuit further comprises:
a pre-charge control circuit, configured to pre-charge the corresponding sensing line to a first pre-charge voltage before the readout circuit receives the sensing voltage, and pre-charge the corresponding sensing line to a second pre-charge voltage before the readout circuit receives the reset voltage.

27. The image sensing circuit of claim 26, wherein the pre-charge control circuit is further configured to receive at least one first pre-scan voltage from at least one readout circuit of the image sensing circuit, and calculate the first pre-charge voltage according to the at least one first pre-scan voltage.

28. The image sensing circuit of claim 26, wherein the pre-charge control circuit is further configured to receive at least one second pre-scan voltage from at least one readout circuit of the image sensing circuit, and calculate the second pre-charge voltage according to the at least one second pre-scan voltage.

29. The image sensing circuit of claim 25, wherein the AFE circuit comprises a differential amplifier, which is configured to generate the image sensing signal by subtracting the reset voltage from the sensing voltage.

* * * * *